No. 742,044. PATENTED OCT. 20, 1903.
J. A. LOW.
MACHINE FOR GATHERING AND LOADING CROPS.
APPLICATION FILED AUG. 14, 1902.
NO MODEL. 2 SHEETS—SHEET 1.
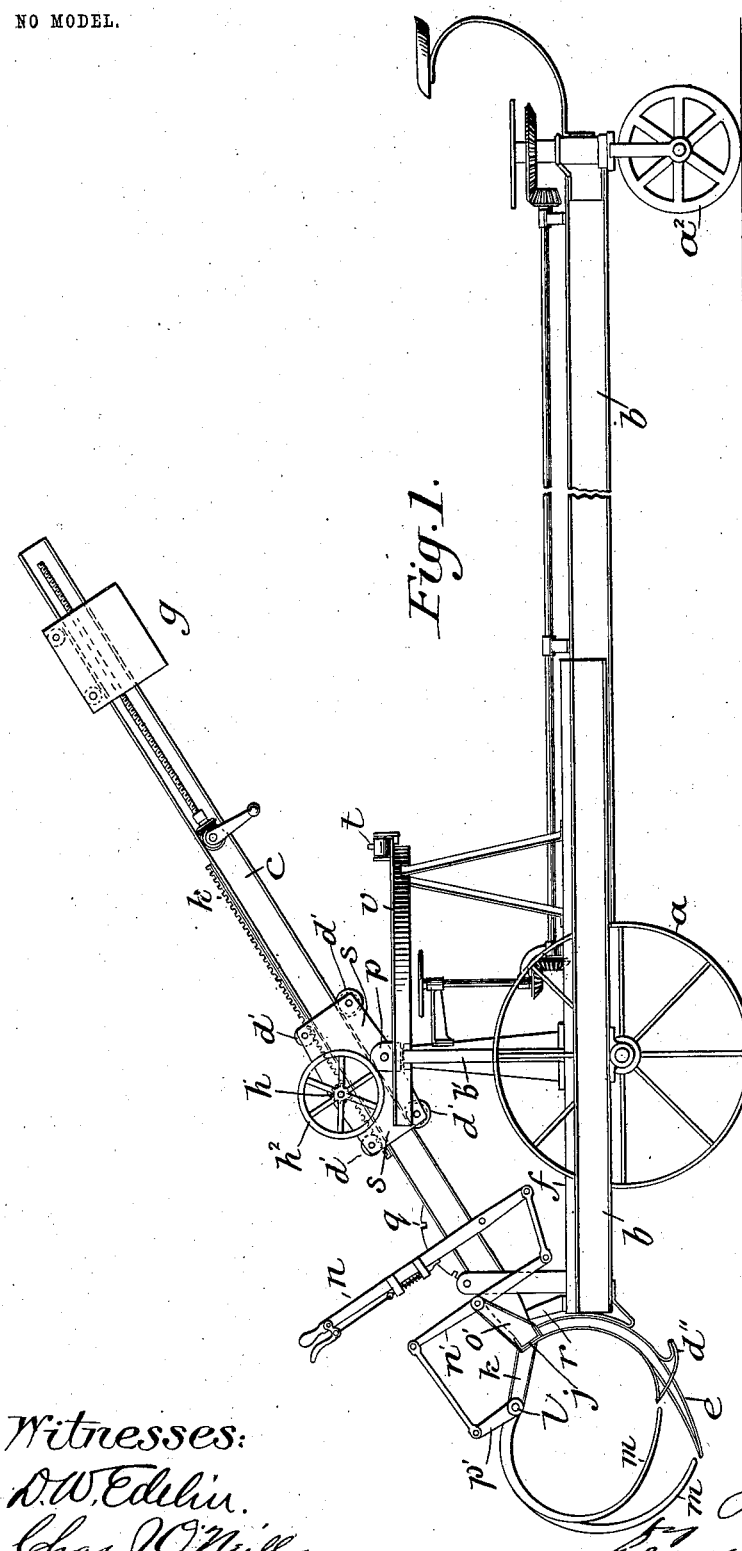
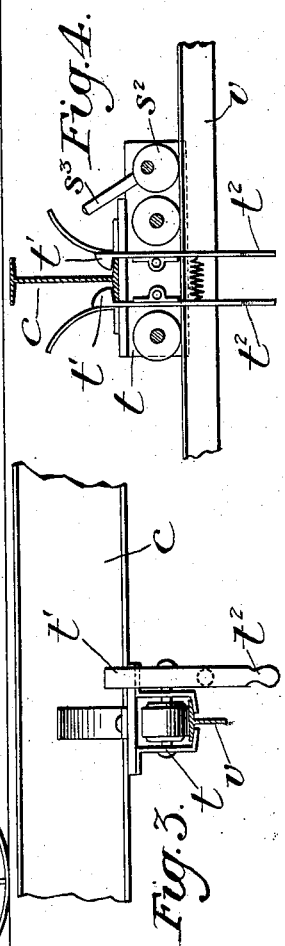
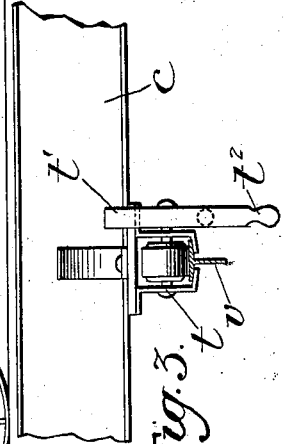
Witnesses:
D. W. Edelin
Chas. J. O'Neill
Inventor:
James A. Low,
[signature] Goldsborough
Att'ys

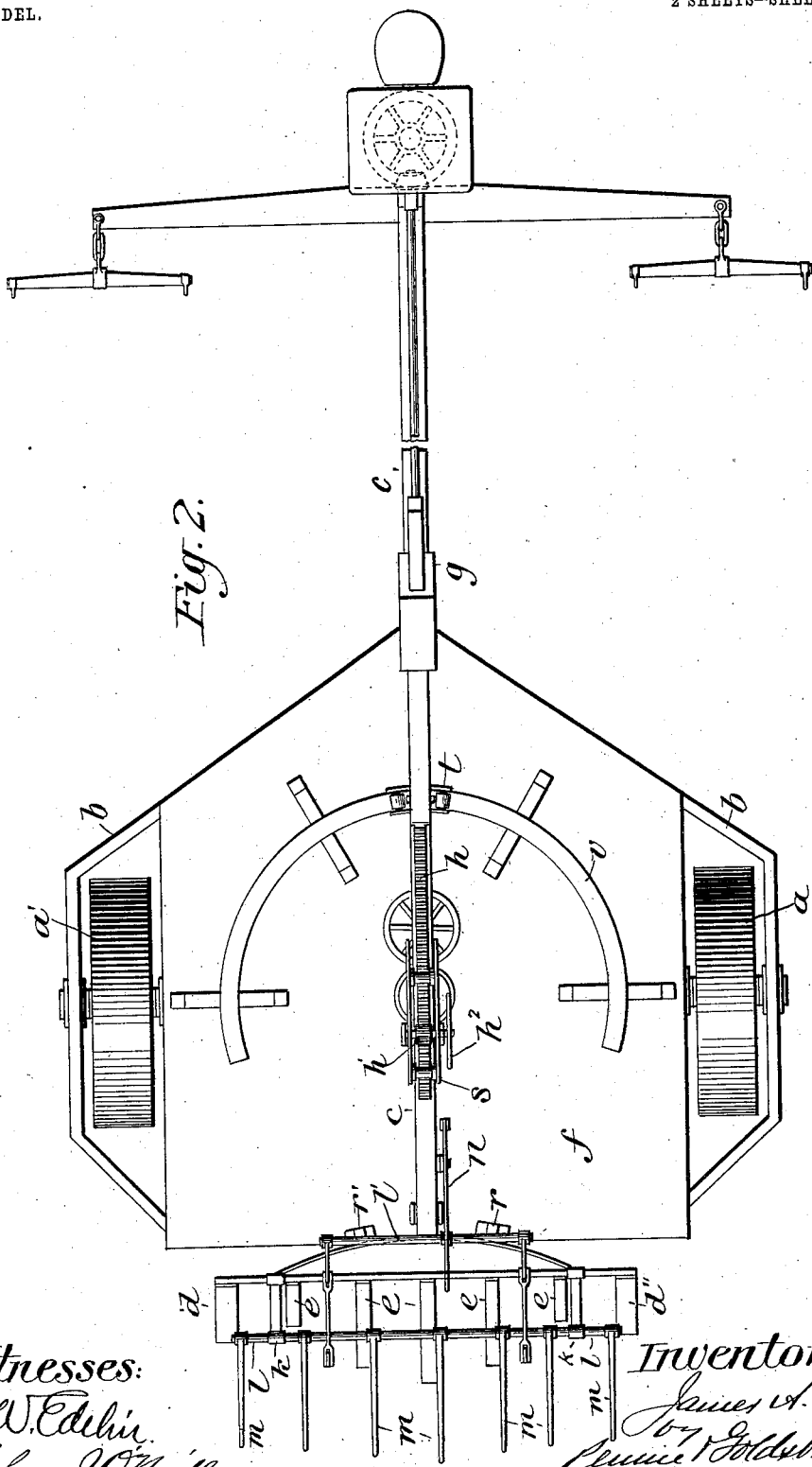

No. 742,044. Patented October 20, 1903.

UNITED STATES PATENT OFFICE.

JAMES A. LOW, OF AIEA, TERRITORY OF HAWAII.

MACHINE FOR GATHERING AND LOADING CROPS.

SPECIFICATION forming part of Letters Patent No. 742,044, dated October 20, 1903.

Application filed August 14, 1902. Serial No. 119,637. (No model.)

*To all whom it may concern:*

Be it known that I, JAMES A. LOW, a citizen of the United States, residing at Aiea, Island of Oahu, Territory of Hawaii, have invented new and useful Improvements in Machines for Gathering and Loading Crops, of which the following is a specification.

My invention is designed principally for use in sugar-cane fields, and is intended to gather the cane which has been previously cut and convey it to a vehicle which has been driven up along either side of the machine.

My invention relates particularly to the method of gathering and conveying the cut cane.

In the accompanying drawings, Figure 1 represents a side elevation of a machine embodying my invention. Fig. 2 represents the machine in a top plan view. Figs. 3 and 4 are details of the trolley and brake, to be hereinafter described.

Similar letters of reference indicate similar parts throughout the views.

Referring to the drawings, it will be noted that the frame $b$ of the machine is mounted on two wheels $a$ $a'$ near its forward end and on a third wheel $a^2$, called the "steering-wheel," near its rear end. The forward end of the frame $b$ carries a platform or floor $f$ for the use of the operator. Near the center of and above this floor $f$ is supported a beam or boom $c$, capable of being tilted. The boom is supported by a standard $b'$, that is erected on the platform about centrally of a track that will be described later on. On the upper end of this standard there is pivoted a yoke $s$, and the boom is held between the side pieces of this yoke, so as to slide lengthwise, the yoke being provided at opposite ends with antifriction-rollers $d'$ to facilitate the sliding of the boom. At right angles to the forward end of this boom $c$ is attached a bar $j$, to which are secured at each end the shoes $d$ $d''$ and along which and between said shoes are located the fingers $e$, projecting downward and forward and arranged to conform as nearly as possible to the contour of the furrows. To the cross-bar $j$ are secured brackets $k$, carrying a shaft $l$, to which are attached tines $m$. The shaft $l$ is operated by means of the lever $n$, which may be locked in two positions, by the quadrant $q$ or other arrangement, such that the tines are either open to receive or closed to grip the load. The lever is pivoted to the boom between its ends, as shown in Fig. 1, and is link-connected to a pair of levers $n'$, that are pivoted to arms $o'$, projecting up from the cross-bar $j$, there being a rod $l'$ secured midway of its length to the lower end of the hand-lever and connected at its opposite ends by links to the two levers $n'$, and these levers are in turn link-connected to crank-arms $p'$, which project up from the shaft $l$. The chuck-blocks $r$ $r'$, secured to the front of the frame $b$, are arranged to receive the backward pressure of the cross-beam $j$ and its fingers $e$. Along the rear of the boom $c$ is provided a counterweight $g$, which is adjustable upon said boom at the will of the operator.

The boom $c$ may be moved forward or backward through the yoke $s$ by means of the rack $h$ and the pinion $h'$ also at the will of the operator. The pinion $h'$ is operated by a hand-wheel $h^2$, the shaft of which carries the pinion and is journaled in the side pieces of the yoke $s$. This boom $c$, with its yoke $s$, is tiltable in a vertical plane about the pivot $p$ and is also capable of being turned in a horizontal plane on a bearing located on the standard below the pivot $p$. About the platform $f$ and in the rear of and concentric with the support for the boom $c$ is mounted a semicircular track $v$, upon which may travel a trolley $t$. When the boom $c$ is tilted to bear upon the trolley $t$, spring-actuated lugs $t'$ $t'$, pivoted to the trolley, grip the boom $c$ until disengaged by the operator pressing together the handles $t^2$ $t^2$.

The machine is propelled by horses or mules attached on opposite sides of and near to the rear end of the frame $b$ and is steered either by the operator or by the driver at the rear of the machine. In transporting the machine to or from the field where it is to be operated the boom is tilted and held in a horizontal position by the lugs $t'$ $t'$ on the trolley $t$ clamped to the track $v$, thus raising the fingers and tines clear of the ground.

To operate the machine, the boom is released from the lugs and lowered until the cross-bar $j$ engages the chuck-blocks. The machine being then moved forward, the shoes preventing the fingers from digging into the furrows, the fingers are forced forward under the cut cane, the cane having been laid upon the tops of and at right angles to the furrows when cut. When sufficient cane has been accumulated in front of the fingers, the machine is stopped and the operator lowers the tines and grips and clamps the load by means of the lever $n$ and quadrant $q$. The load being then counterbalanced by the weight $g$, the operator tilts the boom $c$ and engages it by means of the lugs $t'$ $t'$ to the trolley $t$. The boom with its load is then run forward by the use of the rack and pinion. The trolley is provided with a brake, which, as here shown, consists of an eccentric roller $s^2$, on which being released the load is then swung to either side of the machine and over the vehicle which has been driven up to receive the load. The lever $n$ is released, dumping the load of cane practically parallel with the center line of the machine. The brake is operated by a handle $s^3$. The boom is then brought back to the loading position and the operation as described is repeated.

Having thus fully described my invention, what I claim as new, and desire to secure by Letters Patent, is—

1. A machine for gathering and loading crops comprising a platform, a tiltable boom pivoted on the platform, and having a cross-bar at its front end provided with load receiving and carrying fingers, and shoes to prevent the fingers digging into the ground, a shaft parallel with the cross-bar and having tines for holding the load on the fingers, a counterweight adjustable on the rear end of the boom, means for adjusting the boom longitudinally, a track on the table, and a trolley running on the track and adapted to have the boom attached to it.

2. A machine for gathering and loading crops comprising a platform, a circular track on the platform, a load-carrying boom pivoted concentrically of the track to rotate horizontally, said boom being also tiltable vertically, and means for releasably connecting the rear end of the boom to the track.

3. A machine for gathering and loading crops, comprising a platform, a circular track thereon, a vertically-tiltable load-carrying boom pivoted concentrically of the track to rotate horizontally, and a trolley running on the track and adapted to have the boom releasably locked thereto.

4. A machine for gathering and loading crops, comprising a platform, a circular track thereon, a vertically-tiltable load-carrying boom pivoted concentrically of the track to rotate horizontally, a trolley running on the track, and adapted to have the boom releasably locked thereto, and a brake for the trolley.

5. In a machine for gathering and loading crops, the combination with a vertically-tiltable load-carrying boom, of a cross-bar at its front end carrying a series of fixed load receiving and carrying fingers, a series of pivoted oppositely-disposed tines for holding the load on the fingers, a hand-lever and locking mechanism mounted on the boom, and connections between the lever and the holding-tines whereby the latter may be locked in open or closed position.

6. In a machine for gathering and loading crops, the combination of a platform, a load-carrying boom mounted thereon and adapted to tilt vertically, a series of load receiving and carrying fingers mounted at the front end of the boom, a counterbalance carried by the rear end of the boom, and means for adjusting the counterbalance lengthwise the boom.

In testimony whereof I have signed my name to this specification in the presence of two subscribing witnesses.

JAMES A. LOW.

Witnesses:
ROBT. J. PRATT,
GEO. W. CONNON.